US010441969B2

(12) United States Patent
Siemen et al.

(10) Patent No.: US 10,441,969 B2
(45) Date of Patent: Oct. 15, 2019

(54) EXTRUSION-COATED STRIP FOR RIGID PACKAGINGS

(75) Inventors: Andreas Siemen, Jüchen (DE); Günter Schubert, Rheinbach (DE); Boris Kasper, Haan (DE); Jochen Schwarz, Wassenberg (DE); Antonio Mateo, Grevenbroich (DE)

(73) Assignee: Hydro Aluminium Deutschland GmbH, Bonn (DE)

(*) Notice: Subject to any disclaimer, the term of this patent is extended or adjusted under 35 U.S.C. 154(b) by 732 days.

(21) Appl. No.: 13/257,829

(22) PCT Filed: Mar. 24, 2010

(86) PCT No.: PCT/EP2010/053833
§ 371 (c)(1),
(2), (4) Date: Dec. 2, 2011

(87) PCT Pub. No.: WO2010/108953
PCT Pub. Date: Sep. 30, 2010

(65) Prior Publication Data

US 2012/0064293 A1 Mar. 15, 2012

(30) Foreign Application Priority Data

Mar. 26, 2009 (DE) ........................ 10 2009 003 683

(51) Int. Cl.
*B05D 1/26* (2006.01)
*B29C 48/154* (2019.01)
(Continued)

(52) U.S. Cl.
CPC ............... *B05D 1/265* (2013.01); *B05D 1/40* (2013.01); *B05D 3/0218* (2013.01); (Continued)

(58) Field of Classification Search
CPC ................................................. B05D 2507/02
See application file for complete search history.

(56) References Cited

U.S. PATENT DOCUMENTS 2,961,336 A 11/1960 Uhleen
5,280,054 A 1/1994 Sakai et al.
(Continued)

FOREIGN PATENT DOCUMENTS

CA 2065426 3/1991
CN 1181029 A 5/1998
(Continued)

*Primary Examiner* — Michael P. Rodriguez
(74) *Attorney, Agent, or Firm* — Reinhart Boerner Van Deuren P.C.

(57) ABSTRACT

The invention relates to a method for producing a coated aluminum strip, in which the aluminum strip is unwound from a coil and fed into a unilateral or bilateral extrusion coating arrangement, the aluminum strip is extrusion coated with a thermoplastic polymer and after being extrusion coated, the aluminum strip is reheated to a metal temperature above the melting point of the thermoplastic polymer. The object of providing a method for producing an aluminum strip by which an extrusion-coated aluminum strip can be produced which can be processed at high processing speeds in follow-on composite tools is achieved in that the unilateral or bilateral plastics material coating of the aluminum strip is textured, after being reheated, using rolls which have a superficial structure.

10 Claims, 2 Drawing Sheets

3a 3 3b 2 4 5 7 1 3c 6

(51) Int. Cl.

| | |
|---|---|
| ***B05D 1/40*** | (2006.01) |
| ***B05D 3/02*** | (2006.01) |
| ***B32B 37/15*** | (2006.01) |
| ***C23G 1/00*** | (2006.01) |
| ***B29C 59/04*** | (2006.01) |
| ***B32B 15/085*** | (2006.01) |
| ***B32B 33/00*** | (2006.01) |
| *B05D 5/02* | (2006.01) |
| *B32B 37/08* | (2006.01) |
| *B32B 37/20* | (2006.01) |
| *B32B 38/00* | (2006.01) |
| *B32B 38/06* | (2006.01) |
| *B32B 38/16* | (2006.01) |
| *B29K 23/00* | (2006.01) |
| *B29K 705/02* | (2006.01) |

(52) U.S. Cl.

CPC .......... *B29C 48/154* (2019.02); *B29C 59/046* (2013.01); *B32B 15/085* (2013.01); *B32B 33/00* (2013.01); *B32B 37/153* (2013.01); *C23G 1/00* (2013.01); *B05D 5/02* (2013.01); *B05D 2202/25* (2013.01); *B05D 2252/02* (2013.01); *B05D 2507/02* (2013.01); *B29K 2023/12* (2013.01); *B29K 2705/02* (2013.01); *B32B 37/08* (2013.01); *B32B 37/206* (2013.01); *B32B 38/0036* (2013.01); *B32B 38/06* (2013.01); *B32B 38/162* (2013.01); *B32B 2309/02* (2013.01); *B32B 2309/04* (2013.01); *B32B 2309/105* (2013.01); *B32B 2311/00* (2013.01); *B32B 2323/10* (2013.01); *B32B 2553/00* (2013.01); *Y10T 428/24355* (2015.01)

(56) References Cited

U.S. PATENT DOCUMENTS

| | | | | |
|---|---|---|---|---|
| 5,537,851 | A | 7/1996 | Sheu et al. | |
| 5,976,652 | A * | 11/1999 | Krause et al. | 428/35.9 |
| 6,290,632 | B1 | 9/2001 | Blake et al. | |
| 6,673,391 | B1 | 1/2004 | Perkett et al. | |
| 7,942,991 | B1 | 5/2011 | Loen et al. | |
| 2003/0118783 | A1* | 6/2003 | Berg | B29C 43/222 428/173 |
| 2004/0007175 | A1* | 1/2004 | Levendusky et al. | 118/641 |

FOREIGN PATENT DOCUMENTS

| | | | | |
|---|---|---|---|---|
| EP | 1010641 | A1 | 6/2000 | |
| EP | 1 153 990 | A2 | 11/2001 | |
| EP | 1 254 941 | A1 | 11/2002 | |
| EP | 1 362 653 | A1 | 11/2003 | |
| EP | 1362653 | A1 * | 11/2003 | B21H 8/00 |
| JP | 10-298776 | | 11/1998 | |
| JP | 2001247822 | A | 9/2001 | |
| KR | 10-0352552 | B1 | 11/2002 | |
| WO | WO 96/32202 | A1 | 10/1996 | |
| WO | WO 98/33601 | A1 | 8/1998 | |

* cited by examiner

EXTRUSION-COATED STRIP FOR RIGID PACKAGINGS

FIELD OF THE INVENTION

The invention relates to a method for producing a coated aluminium strip, in which the aluminium strip is unwound from a coil and fed into a unilateral or bilateral extrusion coating arrangement, the aluminium strip is extrusion coated with a thermoplastic polymer and, after being extrusion coated, the aluminium strip is reheated to a metal temperature above the melting point of the thermoplastic polymer. The invention also relates to a correspondingly produced aluminium strip and to the use thereof according to the invention.

BACKGROUND OF THE INVENTION

Aluminium strips which are used in particular for producing beverage cans, especially for producing the ends of cans have to be protected against corrosion caused by the aggressive contents of the beverage cans. This is achieved by coating the aluminium strip used for producing the ends of the cans. Lacquer systems have been used hitherto for coating the can end strip, and after being applied, they have to undergo a stoving process. In addition to the high solvent consumption and the complex disposal of exhaust air from such installations, the lacquer systems also require relatively high stoving temperatures ranging from 230 to 270° C. so that the aluminium strip undergoes a significant softening. Thus, in order to still provide the adequate stability and strength, expensive aluminium alloys with a high magnesium content have to be used which, moreover, are more susceptible to corrosion. It is known from international patent application WO 96/32202 to provide the strip of the can end with an extrusion coating. For this purpose, the aluminium strip is firstly preheated and then coated on one or both sides using an extrusion device. The aluminium strip then undergoes a cooling process in which it is cooled to approximately room temperature. Only after the aluminium strip has fully cooled to room temperature does it come into contact with further strip conveying rolls which further convey the aluminium strip to be wound up. However, to produce can ends, the extrusion-coated aluminium strip has to be subjected to different forming procedures, i.e. stamping and blanking steps. For this purpose, during the production of can ends, the aluminium strip passes at a high speed through a follow-on composite tool in which the individual working steps are carried out in extremely short cycle times. Although the adhesion characteristics of the extrusion coating known from the above-mentioned international patent application may be adequate, when extrusion-coated aluminium strips were processed in the follow-on composite tool, significant problems arose particularly when high production speeds were set. Therefore, hitherto it has only been possible to process extrusion-coated aluminium strips into can ends at very high processing speeds while sustaining a loss in processing speed.

SUMMARY OF THE INVENTION

Therefore, the object of the present invention is to provide a method for producing an aluminium strip which is able to produce an extrusion-coated aluminium strip which can be processed at high speeds in follow-on composite tools. A further object of the present invention is to propose a corresponding aluminium strip and the advantageous use thereof.

According to a first teaching of the present invention, the object indicated above is achieved in that the unilateral or bilateral plastics material coating of the aluminium strip is textured after reheating using rolls which have a superficial structure.

It has surprisingly been found that in texturing the surfaces of the thermoplastic polymer coating, which is still soft after reheating, it is possible to significantly improve the friction characteristics of the aluminium strip. By means of the texturing of the surface of the plastics material coating of the aluminium strip, it is possible to influence the sliding characteristics of the aluminium strip in further processing, so that these sliding characteristics can be optimally adjusted for processing in follow-on composite tools. Furthermore, additives which further improve the sliding characteristics of the coated aluminium strip can be added to the thermoplastic polymer used.

According to a first embodiment of the method according to the invention, a particularly accurate impression of the texturing of the rolls was achieved in that the rolls used for texturing are tempered. Tempered rolls can be purposefully adjusted in their surface temperature to the temperature of the aluminium strip and of the plastics material coating after reheating to achieve a particularly good impression. For example, if the rolls of the plastics material coating are to simultaneously cool the aluminium strip, cooled rolls are used to texture the plastics material coating. Furthermore, it is possible to compensate for the loss in temperature of the aluminium strip after reheating using heated rolls to achieve an adequate impression. The transfer degree of the texture into the coating can be adjusted precisely by the flexibility of the plastics material coating which has been melted on and by the contact pressure forces of the rolls.

If the rolls used for texturing have an isotropic texture or an (EDT) superficial structure introduced using the electron discharge method, particularly good results are obtained in respect of achieving a maximum processing speed in the follow-on composite tool. The EDT superficial structure of the rolls consists of very fine, isotropically distributed depressions in the micrometer range which produce a corresponding surface roughness on the extrusion coating of the aluminium strip. Alternatively, other texturing methods can also be used which produce adequate isotropic superficial structures.

According to a further advantageous embodiment of the method according to the invention, the roughness $R_a$ of the plastics material coating is 0.02 μm to 10 μm after texturing. With these roughness values, the aluminium strip allows a maximum processing speed in the follow-on composite tool.

In order to introduce as precisely as possible the texture which is made in the extrusion-coated aluminium strip and in order not to damage it during further processing, the extrusion-coated aluminium strip is cooled using an air and/or water cooling system after texturing, if necessary in addition to the tempered texturing rolls which are used. In this respect, the aluminium strip is preferably cooled to approximately room temperature so that the thermoplastic polymer coating completely solidifies.

According to a further advantageous embodiment of the method according to the invention, the thickness of the plastics material coating is from 0.2 μm to 20 μm so that on the one hand a very small amount of material is used and on the other, an adequate protective effect, for example against corrosive influences of the contents of the beverage can on the aluminium strip is provided. It has also been found that aluminium strips having thermoplastic polymer coatings with thicknesses of from 0.2 μm to 20 μm can also be processed very effectively, for example into can ends.

A polypropylene or a polypropylene blend is preferably used for the plastics material coating. Polypropylene has in particular very effective barrier characteristics with respect to corrosive liquids and can be extruded onto an aluminium strip at high speeds. Furthermore, during reheating, polypropylene coatings require lower metal temperatures. Thus for example, a PMT (peak metal temperature) of more than 165° C. is sufficient in order to achieve a texturing and at the same time an improvement in the adhesion of the extruded plastics material layer. Very good results were achieved approximately 30° C. above the melting point of the plastics material used in the case of polypropylene within a range of from 195° C. to 210° C. Due to the reheating temperature which is significantly lower compared to the lacquer system, the softening of the aluminium strip remains low so that aluminium alloys with relatively low contents of Mg can be used.

According to a further embodiment of the method according to the invention, before the aluminium strip is extrusion coated on one or both sides, it is subjected to cleaning, degreasing, pickling and a pretreatment by applying a conversion layer or is subjected to an anodising process. A corresponding pretreatment of the aluminium strip makes it possible for the method according to the invention to be carried out without preheating before the extrusion coating procedure, since the adhesion characteristics of the plastics material coating to the aluminium strip are improved most significantly. However, the corrosion characteristics in particular are also significantly improved because aluminium abrasion which results due to the pickling of the surface of the aluminium strip during the rolling procedure, deposits of the alloy elements and the oxide skin are removed very thoroughly and a homogeneous aluminium surface is able to form.

According to a further embodiment of the method according to the invention, an improvement in the adhesion of the thermoplastic polymer coating to the aluminium strip is achieved in that an adhesion-promoting layer is co-extruded during extrusion coating procedure in addition to the thermoplastic polymer coating. Co-extruding an adhesion-promoting layer and a plastics material coating, while further improving the adhesion characteristics of the plastics material coating to the aluminium strip, means that two working operations to apply the adhesion-promoting layer and the plastics material coating are not required.

Furthermore, the method is particularly advantageous when a strip for can ends, in particular for beverage cans is produced. As stated above, the aluminium strips used for producing can ends are subjected to a large number of forming procedures which require particularly good sliding characteristics of the coated aluminium strip in order to achieve high processing speeds, while maintaining all further prerequisites for can ends, such as strength and corrosion resistance. In addition, excessive temperatures are not required during the reheating process, so that in principle the softening of the aluminium strip is low during implementation of the method according to the invention.

According to a second teaching of the present invention, the object indicated above is achieved by an aluminium strip with a unilateral or bilateral thermoplastic polymer layer extruded onto the aluminium strip, in that the surface of the plastics material coating of the aluminium strip has an isotropic texture applied after coating, preferably a texture of an EDT surface.

As stated previously, a corresponding aluminium strip is particularly well suited for the production of can ends because the sliding characteristics of the aluminium strip can be optimised by means of the isotropic texture or the EDT surface, in spite of the extruded plastics material coating, so that high processing speeds are possible.

The roughness $R_a$ of the surface of the thermoplastic polymer coating is preferably from 0.02 μm to 10 μm to ensure optimum sliding characteristics during processing of the aluminium strip. The roughness values relate to measurements of the average roughness $R_a$ according to DIN.

An optimum compromise between a small amount of material used, a good processability and an adequate protective effect against corrosion is achieved in that the thickness of the extrusion coating of the aluminium strip is from 0.2 μm to 20 μm.

If the extrusion coating has a polypropylene or a polypropylene blend layer and optionally an adhesion-promoting layer, due to the good processing characteristics of polypropylene, it is also possible to achieve very high processing speeds and at the same time the barrier effect by polypropylene in respect of corrosive constituents of the beverage cans can be utilised. The polypropylene blend also makes it possible for specific thermal resistances or strengths, for example, to be adjusted. Moreover, the adhesion-promoting layer can be easily co-extruded together with the polypropylene layer or polypropylene blend layer, thereby providing a particularly economical method for producing the extrusion coating of the aluminium strip.

Finally, the object on which the invention is based is achieved by the use of the aluminium strip according to the invention to produce can ends, in particular the ends of beverage cans. As described above, the aluminium strip according to the invention is characterised by a particularly good processability, at the same time with an economical production and good strength and corrosion characteristics.

BRIEF DESCRIPTION OF THE DRAWINGS

There is a plurality of possibilities of configuring and developing the method according to the invention for producing an aluminium strip, a corresponding aluminium strip or the advantageous use of the aluminium strip. In this respect, reference is made to the description of two embodiments in conjunction with the drawings, in which.

DETAILED DESCRIPTION OF THE INVENTION

Figure 1:
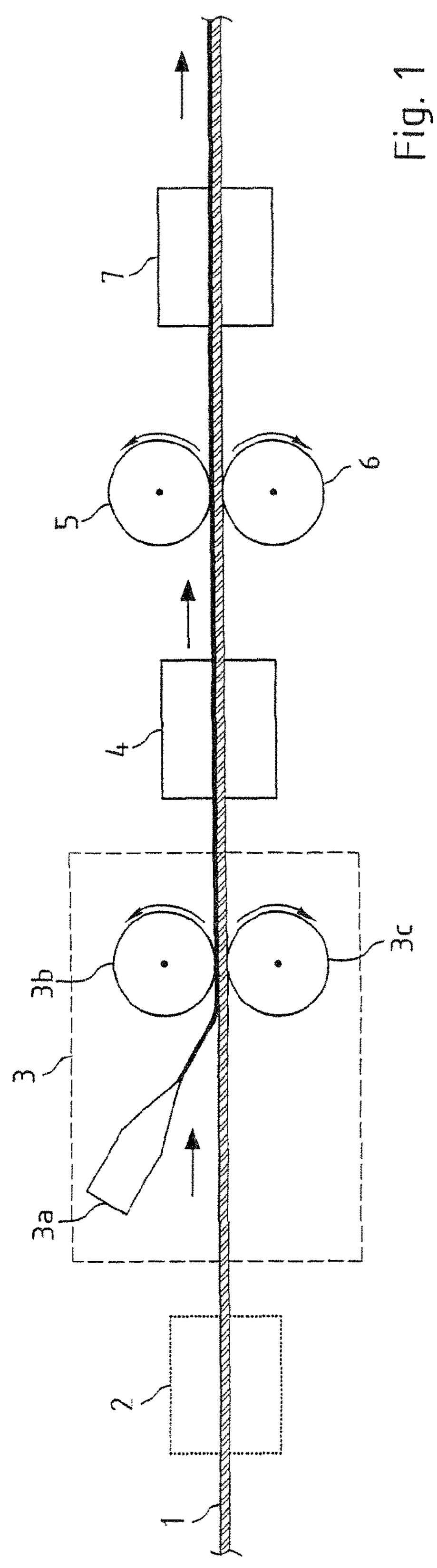
FIG. 1 schematically shows a first embodiment of the method according to the invention for coating one side of an aluminium strip, FIG. 2 schematically shows a second embodiment of the method according to the invention for coating both sides of an aluminium strip, FIG. 3*a*) and b) show a schematic cross-sectional view and a schematic plan view of a third embodiment of an aluminium strip according to the invention.

Firstly, FIG. 1 shows a first embodiment of the method according to the invention for producing an aluminium strip, in particular a can end strip consisting of aluminium. The aluminium strip 1 is unwound from a coil (not shown) and can optionally be fed into a preheating system. Preheating the aluminium strip 1 improves the adhesion of a plastics material coating which is extruded thereon. After preheating, the aluminium strip is fed into the unilateral extrusion coating arrangement 3. The extrusion coating device 3 consists of an extruder 3*a*) and associated application rolls and pressure rolls 3*b*) and 3*c*). The application and pressure rolls 3*b*) and 3*c*) are usually cooled or tempered.

In the present embodiment, the extrusion device 3*a*) is configured such that it can co-extrude an adhesion-promoting layer at the same time as a thermoplastic polymer layer. Polypropylene or a polypropylene blend is preferably used as the thermoplastic polymer layer as it is particularly advantageous in respect of the production of beverage can ends. However, it is also possible to use other plastics materials which can be easily extruded and have good coating characteristics, for example polyethylenes, polyesters, polyamides or polycarbonates.

After one side of the aluminium strip has been extrusion coated, the aluminium strip is fed into a reheating system, reheating taking place in the heating device 4. The heating device 4 can heat the aluminium strip to a specific temperature by convection, induction or by thermal radiation. In the heating device 4, the aluminium strip 1 is heated to a temperature above the melting point of the thermoplastic polymer used. When polypropylene is used, the melting point is 165° C.

It has been found, for example, that heating the aluminium strip 1 to a temperature of more than 30° C. above the melting point of the thermoplastic polymer used for a period of 0.5 to 3 s results in an optimised adhesion of the film to the aluminium strip and the relaxing of the extrusion coating which is slightly orientated due to extrusion. At the same time, however, the reheating temperature is thus significantly lower than the stoning temperature used hitherto in the lacquer systems. Thus, for example, metal temperatures, i.e. a peak metal temperature of more than 165° C., preferably approximately 210° C. are used in the method according to the invention. Compared to the temperatures of 230° C. to 260° C. required for the lacquer systems, this results in a significantly reduced softening of the aluminium strip 1 and thus an improved strength of the can end strip. The method therefore provides the possibility of also using aluminium strips with lower magnesium contents for the production of high-strength can ends.

After the aluminium strip 1 has passed through the reheating device 4, the plastics material coating of the aluminium strip is textured using a texturing roll 5 and a pressure roll 6. Since the pressure roll 6 is only used to support the texturing roll 5, it does not have a specific texture, but is configured instead to carefully transport the aluminium strip. The texturing roll 5 is tempered and in this respect can be adjusted by the surface temperature such that an optimum impression of the roll surface in the plastics material coating is achieved after reheating, depending on the temperature of the aluminium strip 1. In the context of the present invention, the tempering of the rolls can include a heating of the rolls and a cooling of the rolls depending on which temperature of the texturing roll 6 produces a better impression. The textured surface of the plastics material coating has significantly better sliding characteristics in respect of the processing of the coated aluminium strip into, for example can ends. The average roughness values $R_a$, obtained by the plastics material coating after texturing, are from 0.02 μm to 10 μm. Correspondingly processed surfaces are particularly well suited to the production of can ends in the further processing steps, particularly when follow-on composite tools are used. It has been found that a texturing roll 5 which has an EDT surface achieves particularly good results in respect of the processability of the aluminium strip in the subsequent punching and forming processes, because the texturing is particularly fine, isotropic and homogeneous. Depending on the temperature of the aluminium strip after the reheating process, the texturing roll 5 can be cooled or heated to a specific temperature to obtain a good impression result. The aluminium strip with the textured plastics material coating then passes through a further cooling process in which the aluminium strip 1 is preferably cooled to room temperature using air or water cooling means 7. The aluminium strip 1 is preferably cooled immediately after the surface of the coated aluminium strip has been textured so that the texturing is not damaged by the transportation of the strip, for example over further rolls. The winding-up of the aluminium strip onto a coil is not shown in FIG. 1.

Figure 2:
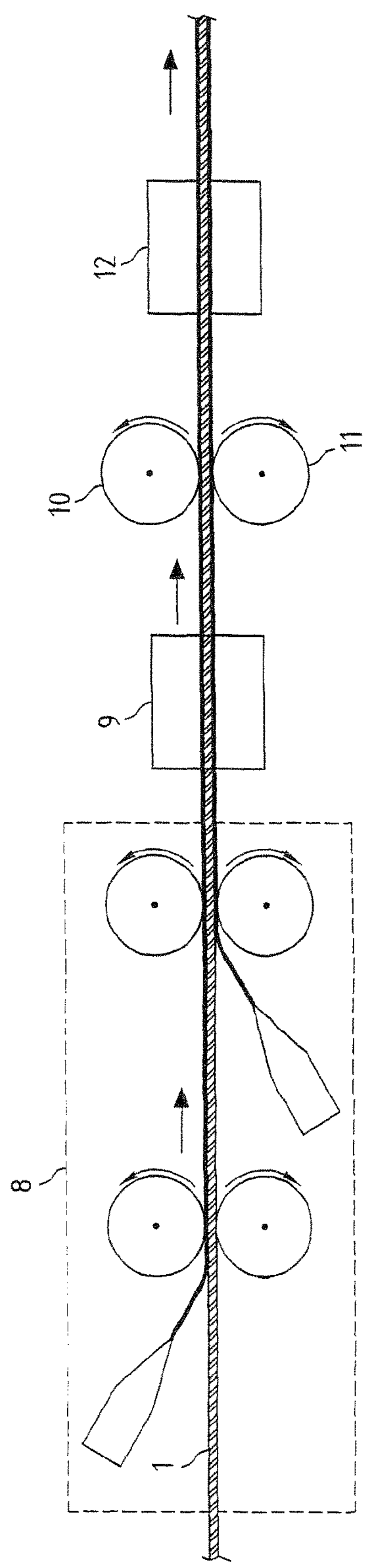

The embodiment illustrated in FIG. 2 differs from the embodiment shown in FIG. 1 not only in that the extrusion coating device 8 produces an extrusion coating on both sides of the aluminium strip 1. Moreover, the aluminium strip 1 passes through the extrusion coating device in a non-preheated state. It has been found that by specifically processing the surface of the aluminium strip before the actual extrusion coating process, it is possible to dispense with a preheating process without the adhesion of an extrusion coating to the aluminium strip 1 being impaired. For this purpose, the aluminium strip has to be degreased after the production process and it then undergoes a pickling step. The pickling process is carried out in an acidic or alkaline manner and pickles the surface of the aluminium strip together with aluminium oxides which are produced on the surface due to the rolling process. The subsequent formation of a thin aluminium oxide film on the surface of the aluminium strip produces a very uniform surface for the conversion treatment. The aluminium strip then undergoes a pretreatment in which a conversion layer for example is applied, which is then dried or activated at approximately 80-150° C. The conversion layer is applied by spraying, rolling or by an immersion treatment. As an alternative to the conversion coating of the aluminium strip, the surface of the aluminium strip can also be anodised.

An aluminium strip treated thus has adequate adhesion characteristics for the plastics material layer extruded thereon, even without being preheated before extrusion coating. The extrusion device 8 preferably co-extrudes a polypropylene layer or a polypropylene blend layer together with an adhesion-promoting layer onto the surface of the aluminium strip, the adhesion-promoting layer also improving the adhesion characteristics.

In the embodiment of FIG. 2, both surfaces of the aluminium strip are extrusion coated sequentially in the extrusion coating device 8. However, it is also conceivable to simultaneously apply the extrusion layer to both sides of the aluminium strip 1. It is also conceivable, however, to provide further cooling steps between the individual extrusion steps to optimally control the temperature of the aluminium strip 1. In this embodiment as well, the aluminium strip 1 then passes through a reheating device 9 in which the aluminium strip 1 is heated to a PMT above the melting point. In the case of a polypropylene coating, a PMT of 210° C. is preferably achieved for 0.5 to 3 seconds. A quick melting of the polypropylene layer onto the aluminium strip 1 produces a good adhesion. However, the surface of the polypropylene coating becomes smooth at these temperatures so that the sliding characteristics of the aluminium strip 1 in subsequent further processing are not optimum.

In this respect, the aluminium strip 1 passes through a pair of texturing rolls 10, 11. Each of the texturing rolls 10 and

11 has a superficial texture and thus this texture is impressed into the plastics material layer which is still warm while the aluminium strip 1 passes through the rolls. The aluminium strip 1 is then fed into a cooling device 12 which either comprises means for water cooling or air cooling. FIG. 2 does not show that the extrusion-coated aluminium strip 1 is then wound up onto a coil.

Figure 3A:
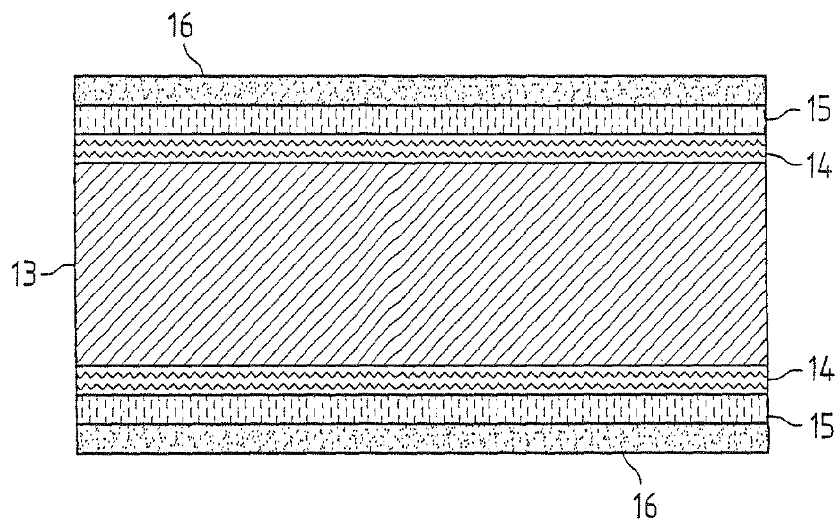
Figure 3B:
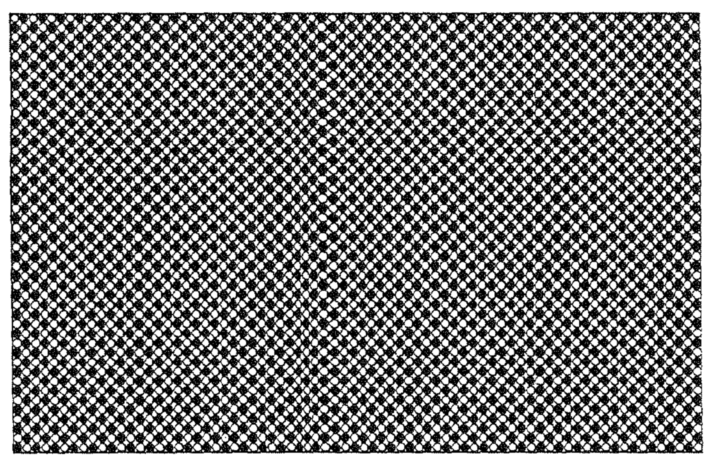

FIG. 3*a*) is a schematic sectional view and FIG. 3*b*) is a schematic plan view of an embodiment of a bilaterally extrusion coated aluminium strip 13. FIG. 3*a*) shows in addition to the aluminium strip 13, the conversion layer 14, the adhesion-promoting layer 15 and the polypropylene layer 16. As already stated, the adhesion-promoting layer 15 and the polypropylene layer 16 have been co-extruded together. In contrast to the aluminium strips known hitherto for producing can ends, the plastics material coating has a precisely defined texture by which the sliding characteristics of the surface of the aluminium strip can be precisely adjusted for the further processing steps.

FIG. 3*b*) schematically shows the surface of the aluminium strip which has been textured by a textured roll with an EDT surface. EDT surfaces have particularly homogeneously distributed circular depressions or recesses which also produce corresponding superficial structures on the plastics material coating. These superficial structures then ensure particularly good further processing characteristics of the aluminium strip 13 in subsequent processing procedures.

The invention claimed is:

1. Method for producing a coated aluminium strip, comprising:

unwinding an aluminium strip from a coil;

feeding the aluminium strip into a unilateral or bilateral extrusion coating arrangement;

coating the aluminium strip via extruding with a thermoplastic polymer coating thereon; reheating the aluminium strip with said thermoplastic polymer coating thereon such that the temperature of the aluminium strip is above the melting point of the thermoplastic polymer coating, and texturing said thermoplastic polymer coating residing on the aluminium strip using rolls which have a superficial structure.

2. Method according to claim 1, wherein the rolls used for texturing are tempered.

3. Method according to claim 1, wherein the rolls used for texturing have an isotropic texture or an EDT superficial structure introduced using the electron discharge method.

4. Method according to claim 1, wherein the roughness $R_a$ of the thermoplastic polymer coating after texturing by the rolls is from 0.02 μm to 10 μm.

5. Method according to claim 1, wherein after texturing, the aluminium strip is cooled using an air and/or water cooling means.

6. Method according to claim 1, wherein the thickness of the thermoplastic polymer coating is from 0.2 μm to 20 μm.

7. Method according to claim 1, wherein a polypropylene or a polypropylene blend is used for the thermoplastic polymer coating.

8. Method according to claim 1, wherein before being coated via extruding, the aluminium strip is subjected to cleaning, degreasing, pickling and a pretreatment by applying a conversion layer or is subjected to an anodising process.

9. Method according to claim 1, wherein during extrusion coating, an adhesion-promoting layer is co-extruded in addition to the thermoplastic polymer coating.

10. Method according to claim 1, wherein a packaging strip for beverage cans, is produced.

* * * * *